United States Patent
Adnan et al.

(10) Patent No.: US 12,028,406 B1
(45) Date of Patent: Jul. 2, 2024

(54) SYSTEMS AND METHODS FOR OBTAINING A FILE VIA ANALYSIS OF FILE LOCATION RECORDS

(71) Applicant: Verizon Patent and Licensing Inc., Basking Ridge, NJ (US)

(72) Inventors: Khalid Adnan, Lincroft, NJ (US); Jun Yuan, Cranbury, NJ (US); Carlos J. Torres, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/317,054

(22) Filed: May 12, 2023

Related U.S. Application Data

(63) Continuation-in-part of application No. 18/172,305, filed on Feb. 21, 2023.

(51) Int. Cl.
*H04L 67/06* (2022.01)
*H04L 61/4511* (2022.01)
*H04L 101/30* (2022.01)

(52) U.S. Cl.
CPC .......... *H04L 67/06* (2013.01); *H04L 61/4511* (2022.05); *H04L 2101/30* (2022.05)

(58) Field of Classification Search
CPC .............................. H04L 67/06; H04L 61/4511
See application file for complete search history.

(56) References Cited

U.S. PATENT DOCUMENTS

| | | | |
|---|---|---|---|
| 6,658,000 B1 | 12/2003 | Raciborski et al. | |
| 9,811,676 B1 * | 11/2017 | Gauvin | G06F 21/57 |
| 10,742,715 B1 | 8/2020 | Adnan et al. | |
| 11,196,797 B2 | 12/2021 | De Angelis et al. | |
| 2004/0003114 A1 | 1/2004 | Adamczyk | |
| 2007/0180485 A1 | 8/2007 | Dua | |
| 2007/0226295 A1 | 9/2007 | Haruna et al. | |
| 2012/0198022 A1 * | 8/2012 | Black | G06F 16/487 709/217 |
| 2015/0264009 A1 * | 9/2015 | Scharber | H04L 67/1095 709/203 |
| 2018/0124124 A1 * | 5/2018 | Corona | H04L 65/1069 |
| 2020/0236083 A1 | 7/2020 | Johns | |
| 2020/0359179 A1 * | 11/2020 | Shah | G06F 16/9566 |

* cited by examiner

Primary Examiner — Viet D Vu

(57) ABSTRACT

In some implementations, a device may receive file location information identifying a file to be transferred to a user device associated with the first network provider. The file location information identifies a domain name associated with a second network provider. The device may provide, based on the file location information, a first request to obtain one or more first records. The one or more first records identify a first supplemental content device. The device may provide, based on the one or more first records, a second request to obtain one or more second records. The one or more second records identify a second supplemental content device. The device may obtain, based on the one or more second records, the file from the second supplemental content device, and provide the file to the user device.

20 Claims, 10 Drawing Sheets

SYSTEMS AND METHODS FOR OBTAINING A FILE VIA ANALYSIS OF FILE LOCATION RECORDS

RELATED APPLICATION

This application is a continuation-in-part of U.S. patent application Ser. No. 18/172,305, entitled "SYSTEMS AND METHODS FOR SELECTIVELY OBTAINING A FILE VIA A DIRECT FILE TRANSFER OR AN INDIRECT FILE TRANSFER," filed Feb. 21, 2023, which is incorporated herein by reference in its entirety.

BACKGROUND

Rich communication services (RCS) is a communication protocol between mobile devices and carriers. RCS provides text-message capabilities similar to short message service (SMS) messaging. Additionally, RCS may provide various enhancements to SMS messaging, such as read receipts, multimedia (e.g., audio, video, picture, etc.) messaging, attachments, customized interactive objects, location sharing, group messaging sessions, among other examples.

DETAILED DESCRIPTION OF PREFERRED EMBODIMENTS

Figure 1A:
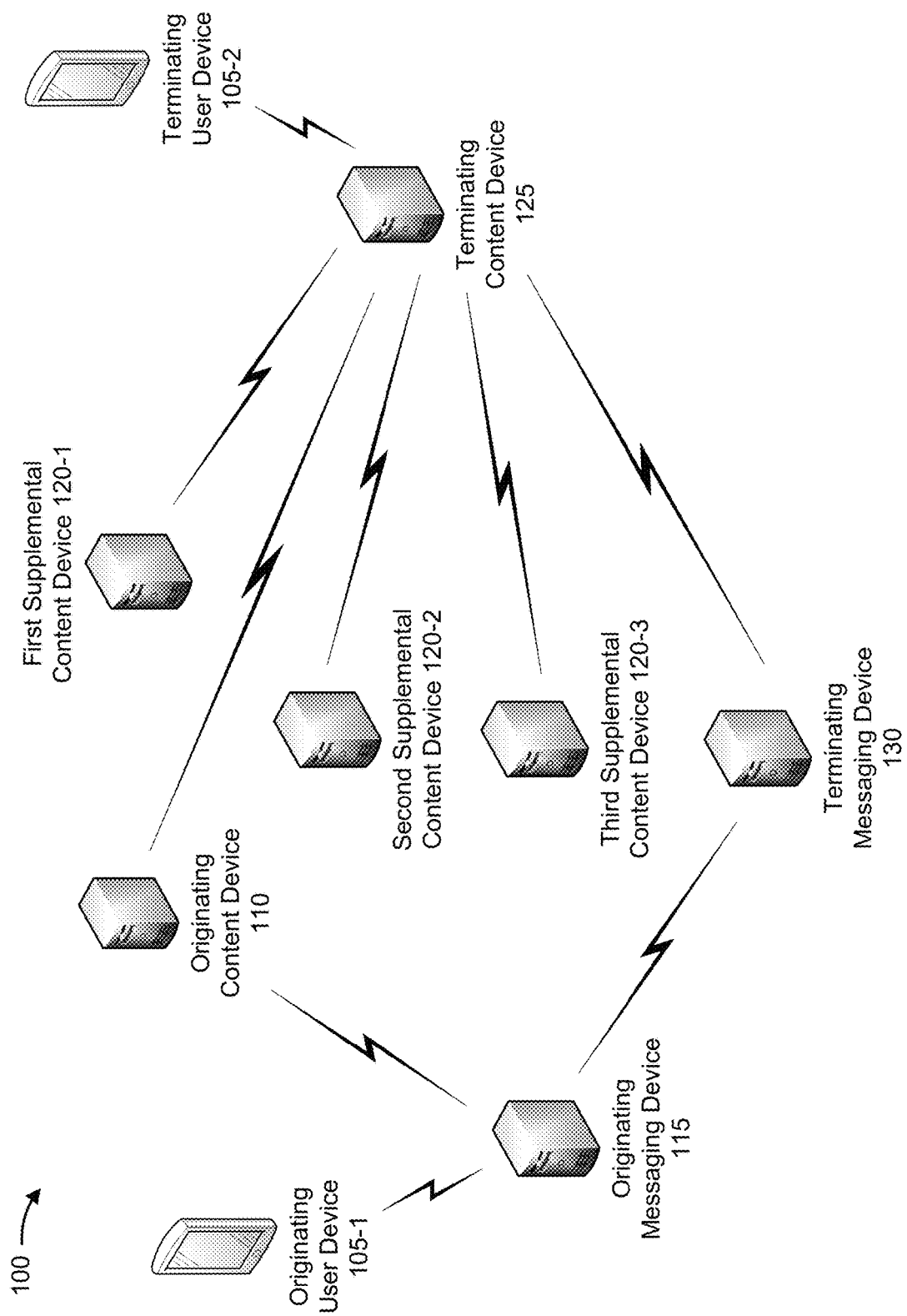
FIGS. 1A-1F are diagrams of an example associated with obtaining a file via a file transfer from one or more supplemental content devices.

The following detailed description of example implementations refers to the accompanying drawings. The same reference numbers in different drawings may identify the same or similar elements.

A file may be transferred by way of a direct network-to-network interface (NNI) file transfer or by a way of an indirect NNI file transfer. The indirect NNI file transfer may be performed via a third-party provider acting as a Rich Communication Services (RCS) service hub (e.g., a third-party content device associated with the third-party provider). As part of the process for transferring the file, a content device of an originating network provider generates a uniform resource locator (URL) that identifies a location of the file. When generating the URL, the content device determines whether the file will be located in the content device or located in the third-party content device. In some circumstances, the third-party content device may be associated by a peering arrangement with an additional third-party content device associated with an additional third-party provider.

As used herein, the term "peering arrangement" may reference a relationship between third-party content devices where a connection is maintained between the third-party content devices in different networks, such that traffic between these third-party content devices in different networks may be exchanged without traversing the public internet. In an RCS system, peering relationships may be established between devices (e.g., content devices) for a variety of reasons, including reducing latency, improving network performance, and minimizing transit costs. Content devices may be peered with each other to improve the likelihood that content is delivered efficiently and reliably to end-users. In an example, a peering relationship may be implemented with an additional third-party content device as a direct peering device or with the additional third-party content device acting as RCS service hub.

When the end-users transfer the file utilizing a URL link provided in a message session relay protocol (MSRP) message, the originating content device has to change the URL link provided depending on whether the file is to be transferred to a content device of a terminating network provider or transferred via an RCS service. As a result, the content device generates different URLs depending on whether the file is to be transferred to the content device of the terminating network provider or transferred via an RCS service. Generating different URLs in this manner wastes computing resources, network resources, and other resources.

Implementations described herein are directed to using file location records to enable a content device, of an originating network provider, to generate a single URL for a file to be transferred, irrespective of peering relationships among the originating content device and other content devices (e.g., supplemental content devices). The supplemental content devices may be third-party content devices.

In some implementations, the file location records may include Name Authority Pointer (NAPTR) records. For example, a device (e.g., a content device), of a terminating network provider, may be configured to receive the URL and determine that a domain name, of the URL, is different than a domain name associated with the terminating network provider.

The content device (of the originating network provider) does not need to configure the URL depending on whether the file is to be transferred via an RCS hub. A file location record, when used by the device of the terminating network provider, may provide the location of the file on supplemental content devices associated with the content device of the originating network provider. The supplemental content devices may provide content for the originating network provider based on a peering arrangement. For example, the file location record may be a NAPTR record and the NAPTR record may indicate whether the file is located on a first supplemental content device, a second supplemental content device, a third supplemental content device, and so on.

Based on the information included in the file location records, the device (of the terminating network provider) may determine whether the file is to be obtained via an indirect NNI file transfer from the first supplemental content device, from the second supplemental content device, from the third supplemental content device, and so on. Using the file location records in this manner preserves computing resources, network resources, and other resources that would have otherwise been used by the content device (of the originating network provider) to generate different URLs for different locations of the file.

FIGS. 1A-1F are diagrams of an example 100 associated with obtaining a file via a file transfer from one or more supplemental content devices. As shown in FIG. 1A, example 100 includes an originating user device 105-1, a terminating user device 105-2, an originating content device 110, an originating messaging device 115, a first supplemental content device 120-1, a second supplemental content device 120-2, a third supplemental content device 120-3, a terminating content device 125, and a terminating messaging device 130.

The terminating user device 105-2, the terminating content device 125, and the terminating messaging device 130 may be associated with a first network provider. The originating user device 105-1, the originating content device 110 and the originating messaging device 115 may be associated with a second network provider. For example, the terminating user device 105-1, the terminating content device 125, and the terminating messaging device 130 may be included in a first network of the first network provider. The originating user device 105-1, the originating content device 110, and the originating messaging device 115 may be included in a second network of the second network provider.

The first network may be a terminating network and the second network may be an originating network. The first supplemental content device 120-1, the second supplemental content device 120-2, and the third supplemental content device may be associated with one or more third-party providers. For example, the first supplemental content device 120-1 may be included in a third network of a third-party provider, the second supplemental content device 120-2 may be included in a fourth network of another third-party provider, the third supplemental content device 120-3 may be included in a fifth network of a yet another third-party provider, and so on.

The originating user device 105-1 may include communication devices and computing devices. For example, the user device 105 may include a mobile phone, a user equipment, a laptop computer, a tablet computer, a camera, a television (e.g., a smart TV), a doorbell, and a desktop computer. The originating user device 105-1 may be configured to execute a first messaging application that enables originating user device 105-1 to communicate with terminating user device 105-2 via one or more messages. In some examples, the first messaging application may include a first RCS application. The first RCS application may be an application that provides RCS messaging functionality on the originating user device 105-1.

The RCS messaging functionality may include, for example, sending, receiving, displaying, and/or interacting with text-based messages, images, video messages, audio messages, attachments, interactive objects, among other examples. The terminating user device 105-2 may be configured to execute a second messaging application that enables terminating user device 105-2 to communicate with the originating user device 105-1 via one or more messages. In some examples, the second messaging application may include a second RCS application similar to the first RCS application.

The originating content device 110 may include one or more devices that are capable of receiving, generating, storing, processing, and/or providing information regarding files that are to be transferred between the originating user device 105-1 and the terminating user device 105-2. For example, the originating content device 110 may initially store the files that are to be transferred and may generate and provide file location information identifying subsequent locations of the files.

The originating messaging device 115 may include one or more devices that are capable of receiving, generating, storing, processing, and/or providing information regarding messages that are to be transferred between the originating user device 105-1 and the terminating user device 105-2. For example, the originating messaging device 115 may be configured to facilitate the exchange of messages between the originating user device 105-1 and the terminating user device 105-2 (e.g., the exchange of RCS messages between the originating user device 105-1 and the terminating user device 105-2).

The first supplemental content device 120-1 may include one or more devices that are capable of receiving, generating, storing, processing, and/or providing file location information regarding files that are to be transferred between the originating content device 110 and the terminating content device 125. For example, the first supplemental content device 120-1 may store the files that are to be transferred and also may generate and provide file location information to identify a location of another supplemental content device acting as an RCS service hub. In an example, the supplemental content device 120-1 may act as an RCS service hub for originating content device 110.

The second supplemental content device 120-2 may include one or more devices that are capable of receiving, generating, storing, processing, and/or providing file location information regarding files that are to be transferred between the originating content device 110 and the terminating content device 125. The second supplemental content device 120-2 may act as an RCS service hub. For example, when acting as an RCS service hub, the second supplemental content device 120-2 may store files for the first supplemental content device 120-1. The file location information may indicate that the files are stored by the second supplemental content device 120-2. The file location information may be generated by the first supplemental content device 120-1 and stored in NAPTR records for the domain of the first supplemental content device 120-1.

The third supplemental content device 120-3 may include one or more devices that are capable of receiving, generating, storing, processing, and/or providing file location information regarding files that are to be transferred between the originating content device 110 and the terminating content device 125. The third supplemental content device 120-3 may act as an RCS service hub. For example, when acting as an RCS service hub, the third supplemental content device 120-3 may store files for the second supplemental content device 120-2. The file location information may indicate that the files are stored by the third supplemental content device 120-3. The file location information may be generated by the second supplemental content device 120-2 and stored in NAPTR records for the domain of the second supplemental content device 120-2.

Terminating content device 125 may include one or more devices that are capable of receiving, generating, storing, processing, and/or providing information regarding the files that are to be transferred between the originating user device 105-1 and the terminating user device 105-. For example, the terminating content device 125 may store the files that are to be transferred and may generate and provide file location information identifying locations of the files.

In some implementations, the terminating content device 125 may use file location records to determine the location of a file to be obtained, based on peering agreements between devices of the second network provider and devices of other network providers. For example, the peering agreements may include an agreement between the second network provider (e.g., the second network) and the first network provider (e.g., the first network) to use file location records to resolve the URL provided for the file (requested by the terminating content device 125).

The peering agreements may further include an agreement between the second network provider (e.g., the second network) and the third-party provider (or hub provider) to agree on the third-party provider acting as a peer to different devices of the second network provider. For example, the first supplemental content device 120-1 may be part of a peering agreement that may facilitate the first supplemental content device 120-1 providing a file that was requested from the originating content device 110. In another example, the second supplemental content device 120-2 may be part of a peering agreement that may facilitate the second supplemental content device 120-2 providing a file that was requested from the first supplemental content device 120-1. Examples further include a peering arrangement where the third supplemental content device 120-3 may be part of a peering agreement that may facilitate the third supplemental content device 120-3 providing a file that was requested from the second supplemental content device 120-2.

Terminating messaging device 130 may include one or more devices that are capable of receiving, generating, storing, processing, and/or providing information associated with messages to be transferred between the originating user device 105-1 and the terminating user device 105-2. For example, the terminating messaging device 130 may be configured to facilitate the exchange of messages between the originating user device 105-1 and the terminating user device 105-2. The exchange of messages may be an exchange of RCS messages.

In the example that follows, the originating user device 105-1 is to engage in a communication session (e.g., an RCS messaging session) with the terminating user device 105-2 and is to ultimately transfer a file to the terminating user device 105-2 via the terminating content device 125, as part of the communication session. The file may include a text file, an image file, or a video file, among other examples. The URLs provided in the figures are merely examples. In practice, different URLs may be used in conjunction with this invention. For example, full URLs may be used In some examples, the originating user device 105-1 (e.g., via the first RCS application) may provide the file to the originating content device 110 to be uploaded. For example, the originating user device 105-1 may provide the file via a Hypertext Transfer Protocol Secure (HTTPS) POST request. The originating content device 110 may receive the file and successfully upload the file. Accordingly, the originating content device 110 may generate file location information identifying a location of the file (e.g., the location with respect to the originating content device 110).

The originating content device 110 and the terminating content device 125 may exchange information directly, as when for example, the terminating content device 125 requests records associated with the file to be transferred. In another example, the originating content device 110 and the terminating content device 125 may exchange information via originating messaging device 115 and terminating messaging device 130.

In some implementations, originating content device 110 may provide file location information that identifies a location of the file (e.g., the location with respect to the originating content device 110). The file location information may be provided to the terminating content device 125. The file location information may include a Uniform Resource Identifier (URI), such as a Uniform Resource Locator (URL) that identifies a domain name associated with the second network provider.

Typically, the originating content device 110 would generate one file location when the file is to be directly received from the originating content device 110 and another file location when the file is to be indirectly received from a supplemental content device. For example, the originating content device 110 would generate one URL that may be used to obtain the file from the originating content device 110 via the direct NNI file transfer and another URL that may be used to obtain the file from the first supplemental content device 120-1 via the indirect NNI file transfer. Yet another URL would be generated by the originating content device 110 when the file is to be obtained from the second supplemental content device 120-2 based on a peering agreement whereby the second supplemental content device 120-2 may store content for the first supplemental content device 120-1 and the second supplemental content device 120-2 may provide the stored content upon request. Generating different URLs in this manner wastes computing resources, network resources, and other resources.

In examples explained herein, the originating content device 110 may generate the file location information (e.g., a single file location identifier) identifying the location of the file, irrespective of whether the file is to be stored by the originating content device 110, the first supplemental content device 120-1, the second supplemental content device 120-2, and so on. By allowing a single file location to be used by the terminating content device 125 to selectively receive the file from the originating content device 110, the first supplemental content device 120-1, the second supplemental content device 120-2, and so on, implementations described herein may preserve computing resources, network resources, and other resources that would have been used to generate different URLs by the originating content device 110.

Figure 1B:
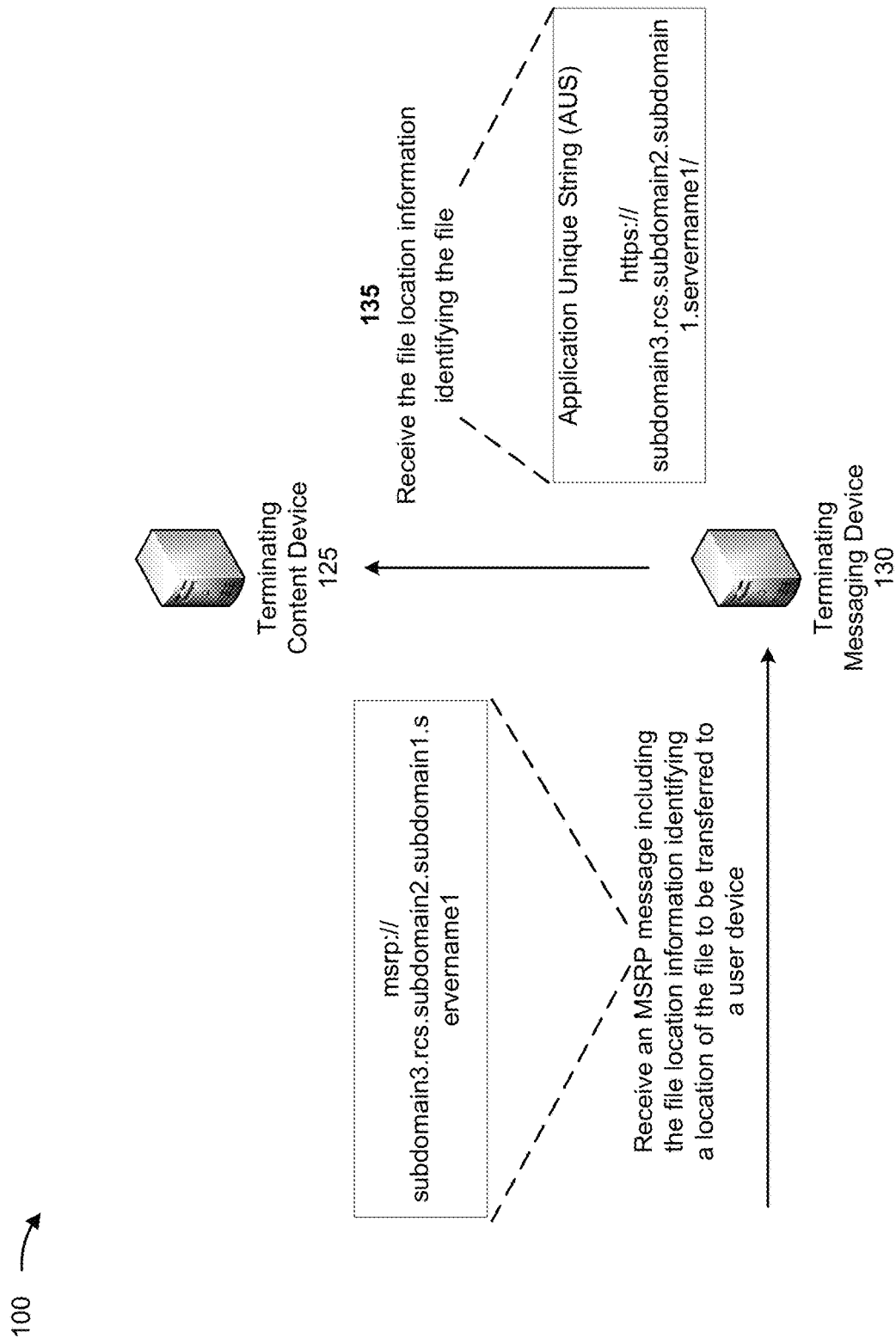

As shown in FIG. 1B, the terminating messaging device 130 may receive an MSRP message including the file location information identifying the location of the file to be transferred to a user device (e.g., the terminating user device 105-2). The MSRP message may be generated by the originating user device 105-1. The terminating messaging device 115-2 may receive the MSRP message from the originating messaging device 110 (e.g., if the file is to be obtained via the direct NNI file transfer). Alternatively, the terminating messaging device 115-2 may receive the MSRP message from a third-party messaging device (e.g., if the file is to be obtained via the indirect NNI file transfer). Terminating messaging device 130 may obtain the file location information from the MSRP message and provide the file location information to the terminating content device 125. The MSRP message contains the URL for the file to be transferred. This URL is used with the file location record for determining the location of the file (e.g., for determining whether the file is located on the originating content device 110 or on a supplemental content device). The originating messaging device 115 may provide the MSRP device based on a request, from the originating user device 105-1, to transfer the file to the terminating user device 105-2.

In some implementations, the second network operator of the originating content device 110 may cause one or more file location records, for the file, to be generated at the originating content device 110, the first supplemental content device 120-1, the second supplemental content device 120-2, and so on. The one or more file location records may be generated by a device included in the second network, such as the originating messaging device 115 and/or another device associated with the second network operator.

The one or more file location records may include information that may be used by the terminating content device 125 to obtain the file, as explained in more detail below. For example, one file location record may include a service field that includes information indicating the direct NNI file transfer (e.g., if the file is stored by the originating content device 110) from a domain name associated with the second network operator. Another file location record may include a service field that includes information indicating the indirect NNI file transfer (e.g., if the file is stored by the first supplemental content device 120-1). Additionally, the other file location record may include a domain name associated with the first supplemental content device 120-1 if the file is to be obtained via the indirect NNI file transfer. Terminating messaging device 130 may obtain the file location information from the MSRP message and provide the file location information to the terminating content device 125. In examples described herein, this file location information provided to the terminating content device 125, from the MSRP message, is referred to as an application unique string (AUS) for the file.

As shown in FIG. 1B, and by reference number 135, the terminating content device 125 may receive the file location information identifying the file from the originating content device 110 (e.g., receive the AUS for the file). As shown in FIG. 1B, the AUS may be provided to the terminating messaging device 130 via an MSRP message. The AUS may be provided to the terminating content device 125 by the terminating messaging device 130.

Figure 1C:
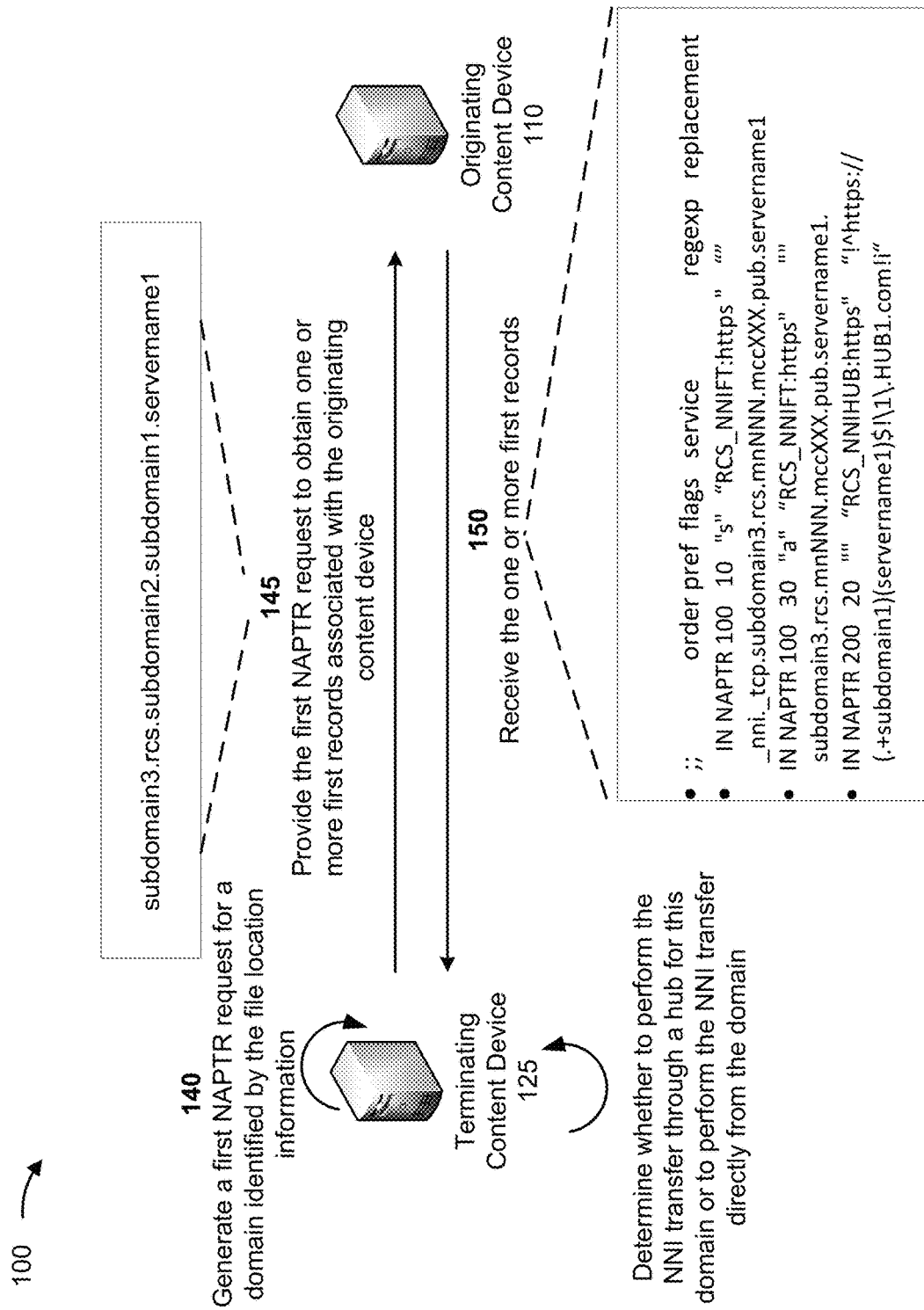

As shown in FIG. 1C, and by reference number 140, the terminating content device 125 may generate a first NAPTR request for a domain identified by the file location information. For example, the terminating content device 125 may, based on the AUS, generate a request to obtain file location records for the domain name associated with the second network provider (e.g., obtain the file location records from the originating content device 110 or another device of the second network provider).

As shown in FIG. 1C, and by reference number 145, the terminating content device 125 may provide the first NAPTR request to obtain one or more first records associated with the originating content device 110. In other words, the terminating content device 125 may obtain the file location records for the domain name associated with the second network provider. The domain name may be a fully qualified domain name (FQDN). For example, the terminating content device 125 may provide the first NAPTR request to the originating content device 110 to obtain file location records for the AUS. The file location records may be stored on a data store of the originating content device 110. The first NAPTR request may be a query for NAPTR records stored in the data store. Additionally, or alternatively, the terminating content device 125 may provide the first NAPTR request to another device associated with the second network provider, such as the originating messaging device 115.

In some implementations, the first NAPTR request may include a query for NAPTR records associated with that domain name. The NAPTR records may provide information about the services associated with the domain name. The information about the services may identify a protocol, a transport, and a service parameters. In this example, the terminating content device 125 may submit a query to the originating content device 110 for NAPTR records associated with the AUS.

An example NAPTR request, used herein, may include a domain name system (DNS) query to a DNS source for the originating content device 110. This DNS query may specify retrieval of records of the "NAPTR" resource record type. This DNS query may further specify the domain name for which the terminating content device 125 is seeking NAPTR records (e.g., specify the AUS of the file).

In some examples, based on this DNS query, the DNS source for the originating content device 110 may respond with the requested NAPTR records. The requested NAPTR records may contain a variety of information about the services associated with the domain. This information can include the Uniform Resource Identifier (URI) scheme for services provided by the domain, as well as priorities for the different services provided by the domain.

As shown in FIG. 1C, and by reference number 150, the terminating content device 125 may receive the one or more first records. For example, the terminating content device 125 may receive the file location records from the originating content device 110 (and/or from another device associated with the second network provider), based on providing the first NAPTR request. The one or more first records may be obtained from the data store of the originating content device 110. The one or more first records may include NAPTR records associated with the file location (e.g., file location records).

The file location records may include (e.g., in NAPTR service fields) information indicating that the file is to be obtained via the direct NNI file transfer or via the indirect NNI file transfer. In some implementations, the file location records may be sorted based on order values of the file location records and/or based on preference values of the file location records. In some implementations, the file location records may be sorted in this manner to indicate an order of a file transfer method (e.g., out of the direct NNI file transfer and the indirect NNI file transfer) to use to obtain the file.

The first NAPTR record and the second NAPTR record may indicate that the file is to be obtained via the direct NNI file transfer. The third NAPTR record may indicate that the file is to be obtained via the indirect NNI file transfer. The NAPTR records and information included in the NAPTR records are merely provided as examples. In practice, different NAPTR records and different information may be used in different situations.

As shown in FIG. 1C, the first NAPTR record includes an order value of 100, a preference value of 10, a flag value of "s," a service field of "RCS_NNIFT:https," and information identifying the domain name of associated with the second network provider. The flag value of "s" may be used to indicate that a network address and a port number of the originating content device 110 may be obtained using the first NAPTR record. The service field of "RCS_NNIFT:https" may indicate that a direct NNI file transfer may be used to retrieve the file from a file location associated with the domain name.

As shown in FIG. 1C, the second NAPTR record includes an order value of 200, a preference value of 30, a flag value of "a," the service field of "RCS_NNIFT:https," and information identifying the domain name associated with the second network provider. The flag value of "a" may be used to indicate that the network address of the originating content device 110 may be obtained using this second NAPTR record.

As shown in FIG. 1C, the third NAPTR record includes an order value of 200, a preference value of 20, no flag value, a service field of "RCS_NNIHUB:https," and information identifying a domain name associated with a third-party provider (e.g., the third network provider). The service field of "RCS_NNIHUB:https" indicates the file is to be obtained via an indirect NNI file transfer. Based on the service field, the third NAPTR record may be used to obtain a network address associated with the first supplemental content device 120-1 of the second network. In this example, the third NAPTR record may indicate that the first supplemental content device 120-1 is acting as a hub provider that may provide the file via an indirect NNI file transfer. Additionally, or alternatively, the first supplemental content device 120-1 (acting as a hub provider) may direct the terminating content device 125 to another file location also acting as a hub provider (e.g., the second supplemental content device 120-2, discussed below).

As shown in FIG. 1C, the terminating content device 125 may determine whether to perform the NNI file transfer through a hub for this domain or to perform the NNI file transfer directly from the domain. In other words, the terminating content device 125 may determine whether it is configured to obtain the file using an indirect NNI file transfer or configured to obtain the file using a direct NNI file transfer. If the terminating content device 125 is configured for the indirect NNI file transfer, the terminating content device 125 may look for the service RCS_NNIHUB: https. For example, the terminating content device 125 may look for NAPTR records with the service field of "RCS_N-NIHUB:https." The terminating content device 125 may request NAPTR records for that domain. Alternatively, if the terminating content device 125 is configured for the direct NNI file transfer, the terminating content device 125 may look for the service RCS_NNIFT:https. For example, the terminating content device 125 may look for NAPTR records with the service field of "RCS_NNIFT:https." This service shows the terminal s record for the origination network provider. In the event the s record cannot be obtained, the terminating content device 125 may identify the next terminal record and may attempt to obtain the file using the FQDN associated with the next record.

Figure 1D:
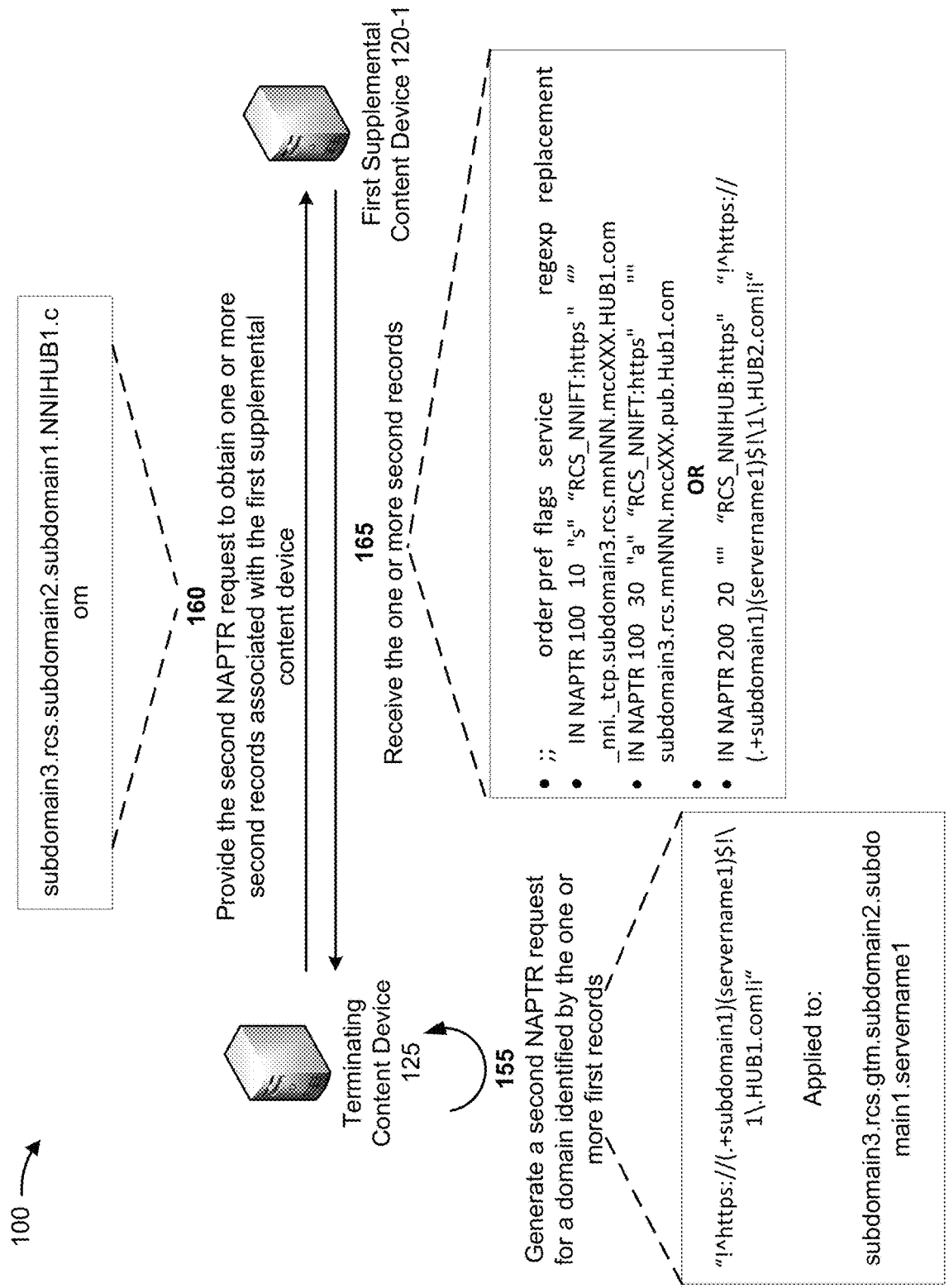

As shown in FIG. 1D, and by reference number 155, the terminating content device 125 may generate a second NAPTR request for a domain identified by the one or more first records. For example, the terminating content device 125 may generate a second NAPTR request to obtain the file location records based on a selected file location record retrieved based on the first NAPTR request. As described below, the terminating content device 125 may perform different actions based on the NAPTR records described above.

For example, assume that the terminating content device 125 has been configured to determine that the service field of "RCS_NNIFT:https" indicates that the file is available by direct NNI file transfer and that the service field of "RCS_N-NIHUB:https" indicates that the file is available by an indirect NNI file transfer from an RCS content hub. In this regard, based on analyzing the NAPTR records, the terminating content device 125 may determine that the first and second NAPTR records indicate that the file may be obtained via the direct NNI file transfer (e.g., from originating content device 110). The terminating content device 125 may determine that the third NAPTR record may indicate that the file may be obtained via a hub device (e.g., via a supplemental content device).

In some situations, the NAPTR records may be selected for use in accordance with a rank based on the order and preference values of the received NAPTR records. For example, the NAPTR records may be ranked in an ascending order of the order values. The NAPTR records may be further ranked based on the preference values of the NAPTR records. For example, NAPTR records of a same order value may be ranked in an ascending order of the preference values. Assuming that the first NAPTR record is ranked higher than the second NAPTR record or the third NAPTR record, the terminating content device 125 may first attempt to obtain the file by a direct NNI connection based on the first NAPTR record (e.g., obtain the file from the file location specified in the first NAPTR record). Assuming that the operation is unsuccessful, and the second NAPTR record is ranked higher than the third NAPTR record, the terminating content device 125 may next attempt to obtain the file based on the second NAPTR record (e.g., from the file location specified in the second NAPTR record.

Assuming that the operation is also unsuccessful, the third NAPTR record may be analyzed by the terminating content device 125 to identify a location of a supplemental content device associated with the file location. The supplemental content device may be the first supplemental content device 120-1. For example, the terminating content device 125 may be configured to analyze the third NAPTR record using one or more data processing techniques to identify information corresponding to the network address of a supplemental device acting as an RCS hub (e.g., the first supplemental content device 120-1 of the third network provider).

In this example, the data processing technique used by the terminating content device 125 involves using a regular expression from the third NAPTR record to identify the domain name of the first supplemental content device 120-1 of the third network provider. To use this technique, the terminating content device 125 may apply a regular expression from the third NAPTR record to the AUS, resulting in the domain name of the first supplemental content device 120-1 of the third network provider. As explained herein, if configured to perform an indirect NNI file transfer, the terminating content device 125 may look for the third NAPTR record and use the third NAPTR record to obtain the file without considering the first and second NAPTR records.

As shown in FIG. 1D, and by reference number 160, the terminating content device 125 may provide the second request to obtain one or more second records associated with a first supplemental content device (e.g., the first supplemental content device 120-1). For example, NAPTR records associated with the AUS may be requested by the terminating content device 125 by submitting a query to the domain name identified above (e.g., by submitting the query to the first supplemental content device 120-1).

As shown in FIG. 1D, and by reference number 165, the terminating content device 125 may receive the one or more records. For example, based on providing the second request, the terminating content device 125 may receive one or more second records from the first supplemental content device 120-1. For example, the one or more second records may include file location records that specify information regarding additional services and file locations that may be used to locate the file. In some implementations, the file location records may include NAPTR records with a structure and function similar to the NAPTR records described above in connection with FIG. 1C.

In some implementations, the NAPTR records may include information indicating that the file may be obtained either by direct NNI file transfer or indirect NNI file transfer from different file locations. As shown in FIG. 1D, the first NAPTR record of the second records retrieved includes an order value of 100, a preference value of 10, a flag value of "s," a service field of "RCS_NNIFT:https," and information identifying the domain name associated with the third network provider (e.g., the first supplemental content device 120-1). The service field of "RCS_NNIFT:https" may indicate a direct NNI file transfer from the third network provider is available.

The second NAPTR record includes an order value of 200, a preference value of 30, a flag value of "a," the service field of "RCS_NNIFT:https," and information identifying the domain name of the first supplemental content device 120-1 associated with the third network provider. The flag value of "a" may be used to indicate that the network address of the first supplemental content device 120-1 may be obtained using this second NAPTR record.

The third NAPTR record includes an order value of 200, a preference value of 20, no flag value, a service field of "RCS_NNIHUB:https," and information identifying a domain name associated with another third-party provider (e.g., the fourth network provider). The service field of "RCS_NNIHUB:https" indicate an indirect NNI file transfer from a file location associated with the domain name. In this record, the above noted service field may indicate that the file may be located at a content device that is linked to the first supplemental content device 120-1 by a peering arrangement. In this example, the third NAPTR record may be used to obtain a network address associated with the second supplemental content device 120-2 of the fourth network provider. The third NAPTR record may be used after unsuccessfully attempting to obtain the file using the first NAPTR record and the second NAPTR record.

The NAPTR records, received from the first supplemental content device 120-1, may depend on whether the first supplemental content device 120-1 has a peering arrangement with an additional supplemental content device. For example, if the first supplemental content device 120-1 has a peering arrangement with an additional supplemental content device, the NAPTR records may include a NAPTR record with a service field of "RCS_NNIHUB:https" (e.g., the third NAPTR record). Alternatively, if the first supplemental content device 120-1 does not have a peering arrangement with an additional supplemental content device, the NAPTR records may include NAPTR records with a service field of "RCS_NNIFT:https" (e.g., the first and second NAPTR records).

Figure 1E:
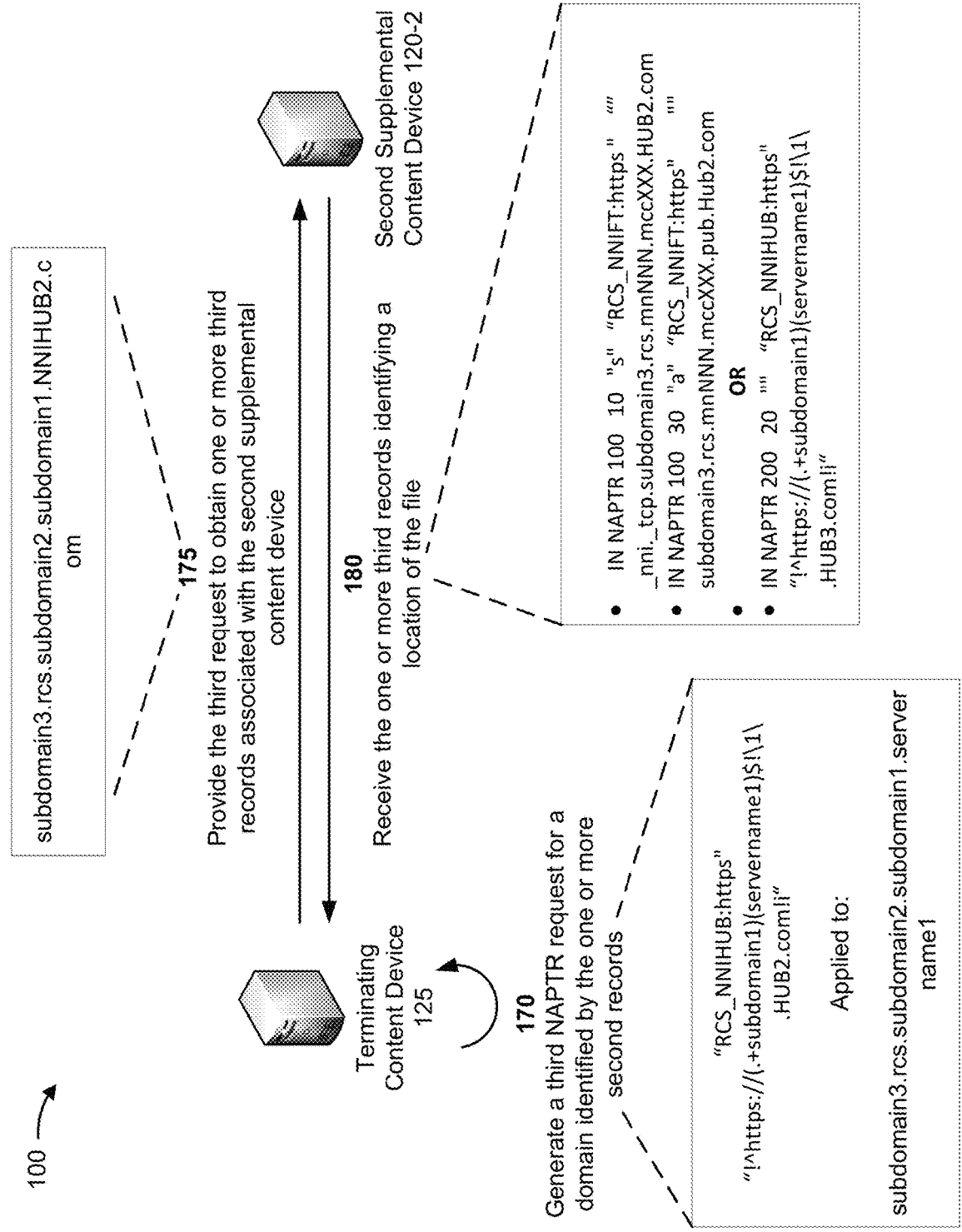

As shown in FIG. 1E, and by reference number 170, the terminating content device 125 may generate a third NAPTR request for a domain identified by the one or more second records. For example, the terminating content device 125 may generate the third request for the second supplemental content device 120-2 for the location of the file based on the second NAPTR records. For example, assuming that the first supplemental content device 120-1 has a peering arrangement with the second supplemental content device 120-2 and that the one or more second records include the third NAPTR record, the terminating content device 125 may use the third NAPTR record (of the one or more second records) to identify the domain name of the second supplemental content device 120-2. The second supplemental content device 120-2 may be acting as a hub linked to the first supplemental content device 120-1 by a peering arrangement.

In this example, the terminating content device 125 may use a regular expression data processing technique similar to the technique described above to identify the domain name of the second supplemental content device 120-2. Using this technique, the terminating content device 125 may apply a regular expression identified (in the third NAPTR record of the one or more second records) to the AUS. In some implementations, applying the regular expression in this manner may result in the identification of the second supplemental content device 120-2 that is peered with the first supplemental content device 120-1 of the third network provider. This regular expression was included in the third NAPTR record above that identified the second supplemental content device 120-2 as a hub provider for the originating content device 110. This analysis, as shown by reference number 175, may yield a domain name associated with the second supplemental content device 120-2 (e.g., a network address associated with the second supplemental content device 120-2). In an example, the domain name associated with the second supplemental content device 120-2 may be used to generate a third request, submitted to the second supplemental content device 120-2, to identify the file location.

As shown in FIG. 1E, and by reference number 175, the terminating content device 125 may provide the third NAPTR request to obtain one or more third records associated with the second supplemental content device 120-2. In some examples, based on the domain name of the second supplemental content device 120-2 identified based on applying the regular expression to the AUS, the third request can be generated for the file location records associated with the domain name.

As shown in FIG. 1E, and by reference number 180, the terminating content device 125 may receive the one or more third records identifying a location of the file. For example, based on the third request, one or more third records that correspond to the location of the file may be received from the second supplemental content device 120-2. In some implementations, the location of the file may be derived from NAPTR records with a structure and function similar to the NAPTR records described above.

As shown in FIG. 1E, the first NAPTR record of the one or more third records includes an order value of 100, a preference value of 10, a flag value of "s," a service field of "RCS_NNIFT:https," and information identifying the domain name associated with the fourth network provider (e.g., the second supplemental content device 120-2). In this example, the service field of "RCS_NNIFT:https" may indicate an indirect NNI file transfer may be performed of the file from the fourth network provider.

The second NAPTR record of the one or more third records includes an order value of 100, a preference value of 30, a flag value of "a," the service field of "RCS_NNIFT:https," and information identifying the domain name associated with the fourth network provider. In this example, the service field of "RCS_NNIFT:https" may indicate an indirect NNI file transfer may be performed of the file from the second supplemental content device 120-2 of the fourth network provider.

In some implementations, the one or more third records, received from the second supplemental content device 120-2, may depend on whether the second supplemental content device 120-2 has a peering arrangement with an additional supplemental content device. For example, if the second supplemental content device 120-2 does not have a peering arrangement with an additional supplemental content device, the one or more thirds records may not include a NAPTR record with a service field of "RCS_NNIHUB:https." Accordingly, the lack of a NAPTR record in the one or more third records with a service field of "RCS_NNIHUB:https," may indicate to the terminating content device 125 that the domain (indicated by the one or more third NAPTR records) is the location of the file (e.g., for retrieval by the terminating content device 125).

In some situations, alternatively to the two NAPTR records shown in FIG. 1E, a third NAPTR record may be received. For example, if the second supplemental content device 120-2 has a peering arrangement with an additional supplemental content device, the one or more third records may include the third NAPTR record. The third NAPTR record may include a service field of "RCS_NNIHUB:

https," and information identifying a domain name associated with another third-party provider acting as a hub for the second supplemental content device 120-2. In this example, the third supplemental content device 120-3 may be identified as the hub for the second supplemental content device 120-2. In this record, the above noted service field may indicate that the file may be located at the third supplemental content device 120-3 that is linked to the second supplemental content device 120-2 by a peering arrangement. In this example, the third NAPTR record may be used to obtain a network address associated with the third supplemental content device 120-3 of the fourth network provider.

Figure 1F:
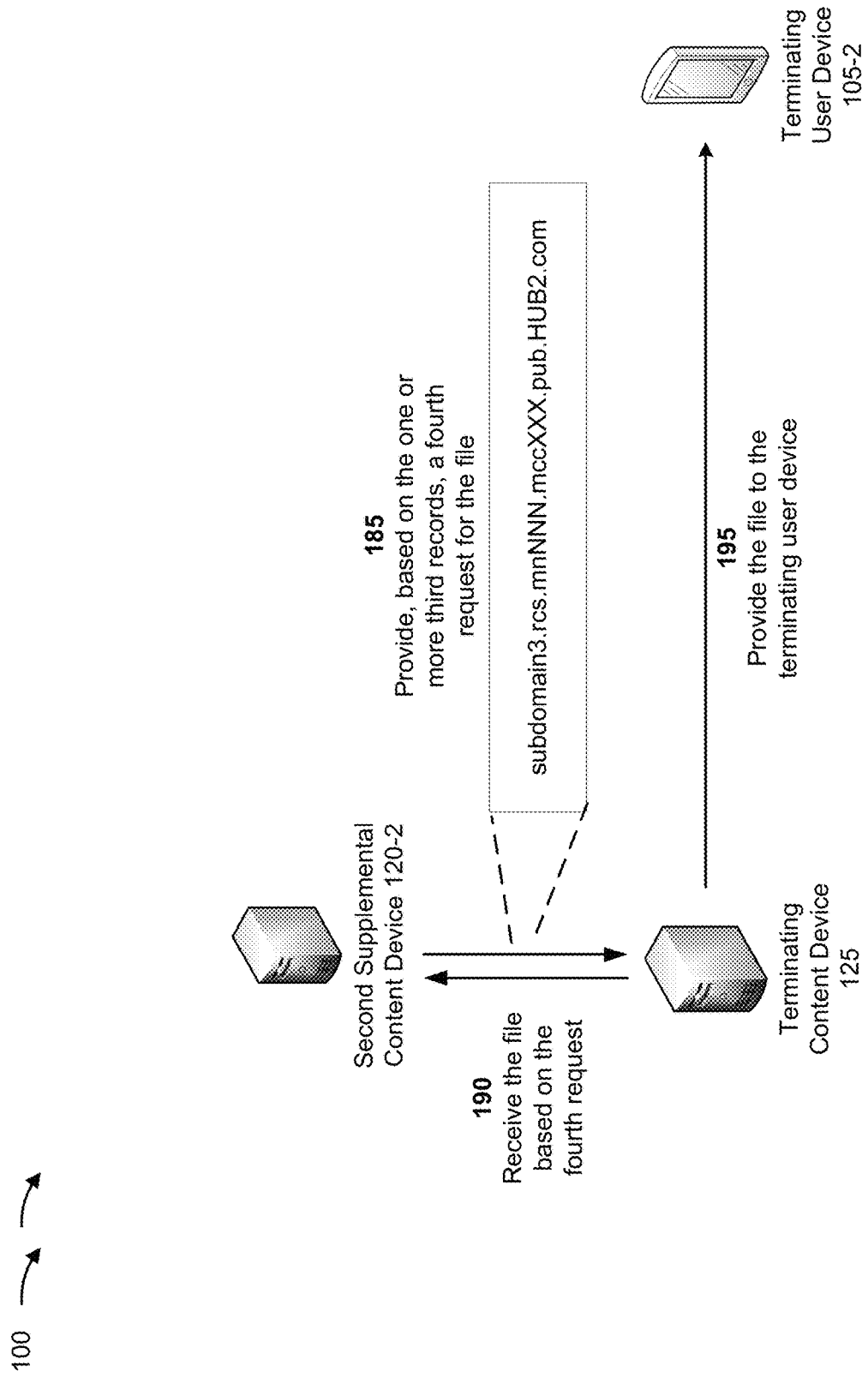

As shown in FIG. 1F, and by reference number 185, the terminating content device 125 may provide, based on the one or more third records, a fourth request for the file. The fourth request may be provided to the second supplemental content device 120-2 of the fourth network.

In an example, based on ranking approach described with reference number 150 above, the first or the second NAPTR record may be selected for retrieval of the file, e.g., based on the service fields of these records corresponding to "RCS_NNIFT:https." As shown in FIG. 1F, the address used to retrieve the file from the second supplemental content device 120-2 corresponds to the second NAPTR record discussed in connection with reference number 180.

Referring back to the alternative example of the NAPTR record that identified the third supplemental content device 120-3, a request may be submitted to the third supplemental content device 120-3 to obtain one or more fourth NAPTR records associated with the AUS. In this regard, the terminating content device 125 may receive NAPTR records similar to the NAPTR records shown in FIG. 1E. For example, the NAPTR record may include a service field corresponding to "RCS_NNIFT:https" and a URL for obtaining the file from third supplemental content device 120-3.

As shown in FIG. 1F, and by reference number 190, the terminating content device 125 may receive the file based on the fourth request. For example, based on providing the fourth request, the terminating content device 125 may receive the file from the second supplemental content device 120-2. In an example, based on the location of the file determined by analysis of the NAPTR records, the terminating content device 125 may obtain the file from the second supplemental content device 120-2.

In the alternative example, where the third supplemental content device 120-3 is specified as a hub for the second supplemental content device 120-2, the NAPTR records received from the third supplemental content device 120-3 may be analyzed to obtain the URL for obtaining the file from the third supplemental content device 120-3.

As shown in FIG. 1F, and by reference number 195, the terminating content device 125 may provide the file to the terminating user device (e.g., the terminating user device 105-2). For example, once the file has been received by the terminating content device 125, the file may be provided (e.g., via the first provider network) to the terminating user device 105-2. Using the file location records as described herein in preserves computing resources, network resources, and other resources that would have otherwise been used by the content device (of the originating network provider) to generate different URLs for different locations of the file.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
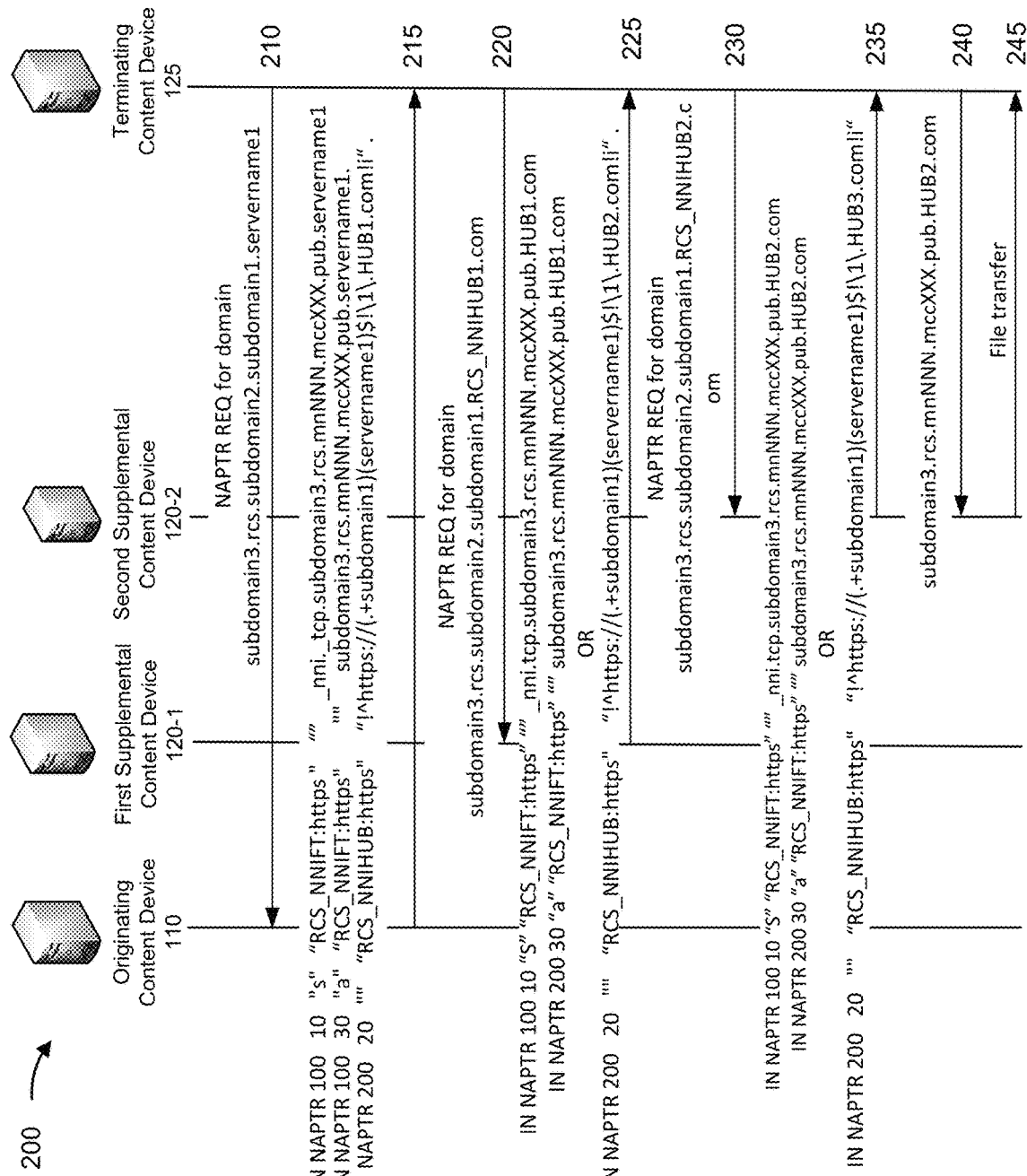
FIG. 2 is a diagram of an example call flow in accordance with systems and/or methods described herein.

FIG. 2 is a is a diagram of an example call flow 200 in accordance with example systems and/or methods described herein. As shown in FIG. 2, a sequence chart is provided illustrating communication between, and operations of, the user device 105, the originating content device 110, the originating messaging device 115, the first supplemental content device 120-1, the second supplemental content device 120-2, the terminating content device 125, and the terminating messaging device 130.

As show in FIG. 2, call flow 200 begins at reference number 210 when the terminating content device 125 submits a first NAPTR request to the originating content device 110 for NAPTR records associated with a first domain (e.g., as described above in connection with FIG. 1C). In this example, the domain corresponds to the AUS received by the terminating messaging device 130 with the MSRP message for the file to be retrieved by the terminating content device 125, as described with FIG. 1B above.

As shown in FIG. 2, call flow 200 continues at reference number 215 with the originating content device 110 receiving the NAPTR request and returning first NAPTR records (e.g., as described above in connection with FIG. 1C).

As shown in FIG. 2, call flow 200 continues at reference number 220 when the terminating content device 125 submits a second request to the first supplemental content device 120-1 for NAPTR records associated with a second domain (e.g., as described above in connection with FIG. 1D). In an example, this second domain was identified based on applying a regular expression from the NAPTR records received from the originating content device 110 (e.g., as described above).

As shown in FIG. 2, call flow 200 continues at reference number 225 with the first supplemental content device 120-1 receiving the second NAPTR request and returning second NAPTR records (e.g., as described above in connection with FIG. 1D). In an example, the NAPTR records correspond to the first supplemental content device 120-1 and provide a URL where the file may be retrieved by the terminating content device 125. Alternatively, the NAPTR records include a regular expression that links to the second supplemental content device 120-2 (e.g., based on a peering arrangement between the first supplemental content device 120-1 and the second supplemental content device 120-2).

As shown in FIG. 2, call flow 200 continues at reference number 230 when the terminating content device 125 submits a third request to the second supplemental content device 120-2 for NAPTR records associated with a third domain to identify the location of the file. In an example, the third domain may be identified based on applying a regular expression from the second NAPTR records received to the AUS (e.g., as described above in connection with FIG. 1E).

As shown in FIG. 2, call flow 200 continues at reference number 235 with the second supplemental content device 120-2 receiving the third NAPTR request and returning third NAPTR records (e.g., as described above in connection with FIG. 1E). In an example, these third NAPTR records correspond to the second supplemental content device 120-2 and provide URLs where the file may be retrieved by the terminating content device 125.

As shown in FIG. 2, call flow 200 continues at reference number 240 where the terminating content device 125 provides a request for the file based on the URLs included in the third NAPTR records (e.g., as described above in connection with FIG. 1F).

As shown in FIG. 2, call flow 200 continues at reference number 245 where the terminating content device 125 receives the file from the second supplemental content device 120-2 (e.g., as described above in connection with FIG. 1F).

As indicated above, FIG. 2 is provided as an example. Other examples may differ from what is described with regard to FIG. 2.

Figure 3:
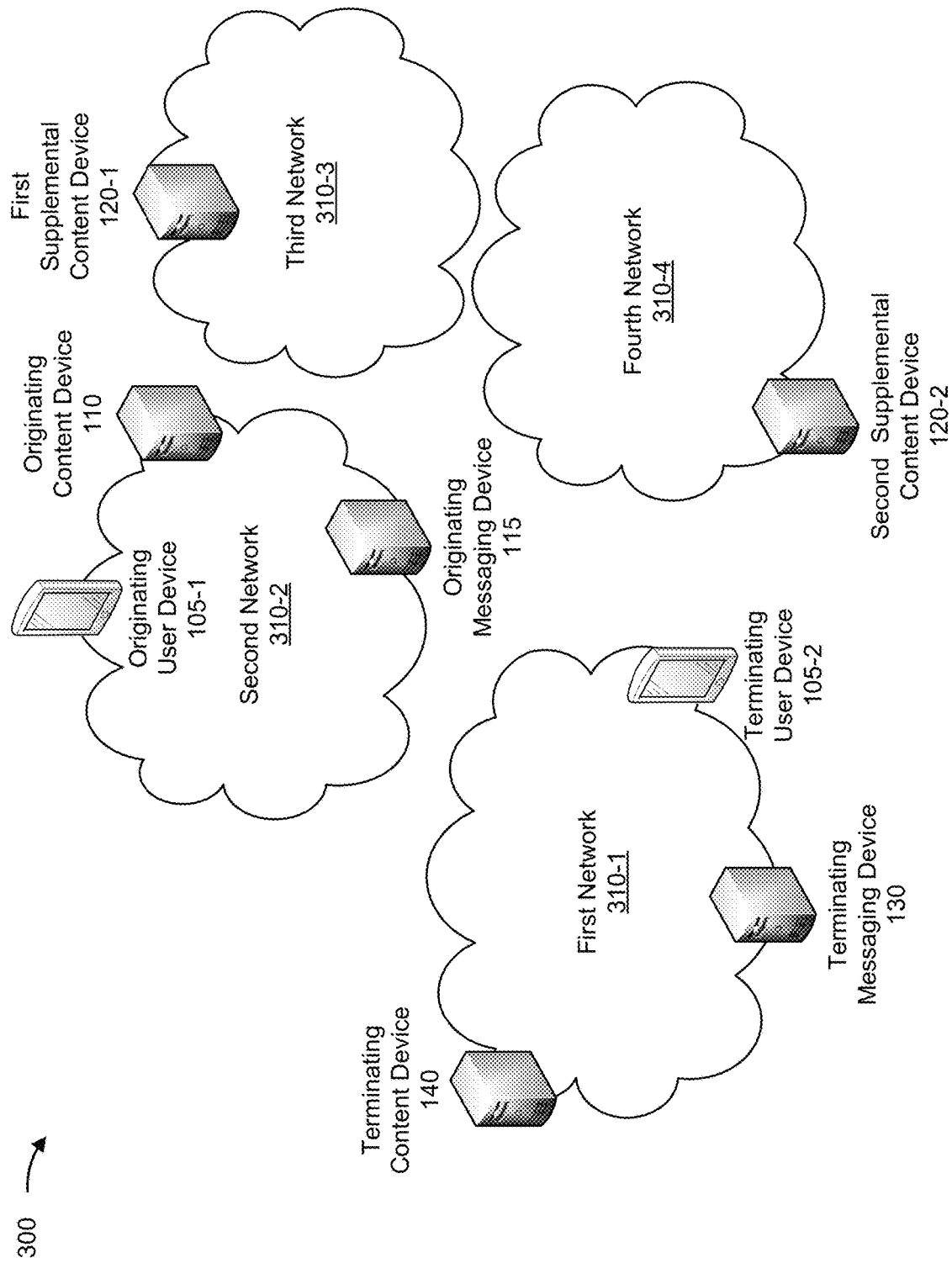
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include the originating user device 105-1, the terminating user device 105-2, the originating content device 110, the originating messaging device 115, the first supplemental content device 120-1, and the second supplemental content device 120-2, the terminating messaging device 130, and the terminating content device 125. The originating user device 105-1, the terminating user device 105-2, the originating content device 110, the originating messaging device 115, the first supplemental content device 120-1, the second supplemental content device 120-2, the terminating messaging device 130, and the terminating content device 125 have been described above in connection with FIG. 1.

The terminating user device 105-2, the terminating content device 125, and the terminating messaging device 130 may be included in a first network 310-1 of the first network provider. The originating user device 105-1, the originating content device 110 and the originating messaging device 115 may be included in a second network 310-2 of the second network provider. The first supplemental content device 120-1 may be included in a third network 310-3 of the third network provider. The second supplemental content device 120-2 may be included in a fourth network 310-4 of the fourth network provider.

The originating user device 105-1 may include a communication device and a computing device. For example, the user device 105 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The terminating user device 105-2 may be similar to the terminating user device 105-2.

The originating content device 110 may include a communication device and a computing device. For example, the originating content device 110 may include a server, such as an application server, a client server, a web server, a database server, a host server, a proxy server, a virtual server (e.g., executing on computing hardware), or a server in a cloud computing system. In some implementations, the originating content device 110 includes computing hardware used in a cloud computing environment. Terminating content device 125, the first supplemental content device 120-1, and the second supplemental content device 120-2 may be similar to the originating content device 110.

The originating messaging device 115 may include a communication device and a computing device. For example, the originating messaging device 115 may include a server, such as an application server, a client server, a web server, a database server, a host server, a proxy server, a virtual server (e.g., executing on computing hardware), or a server in a cloud computing system. In some implementations, the originating content device 110 includes computing hardware used in a cloud computing environment. Terminating messaging device 130 may be similar to the originating messaging device 115.

First network 310 includes one or more wired and/or wireless networks. For example, first network 310-1 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. First network 310-1 may enable communication among the devices of environment 300.

Second network 310-2, third network 310-3, and fourth network 310-4 may be similar to first network 310-1. In some examples, third network 330 may be implemented as a network that provides an interconnection service between first network 310-1 and second network 310-2.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
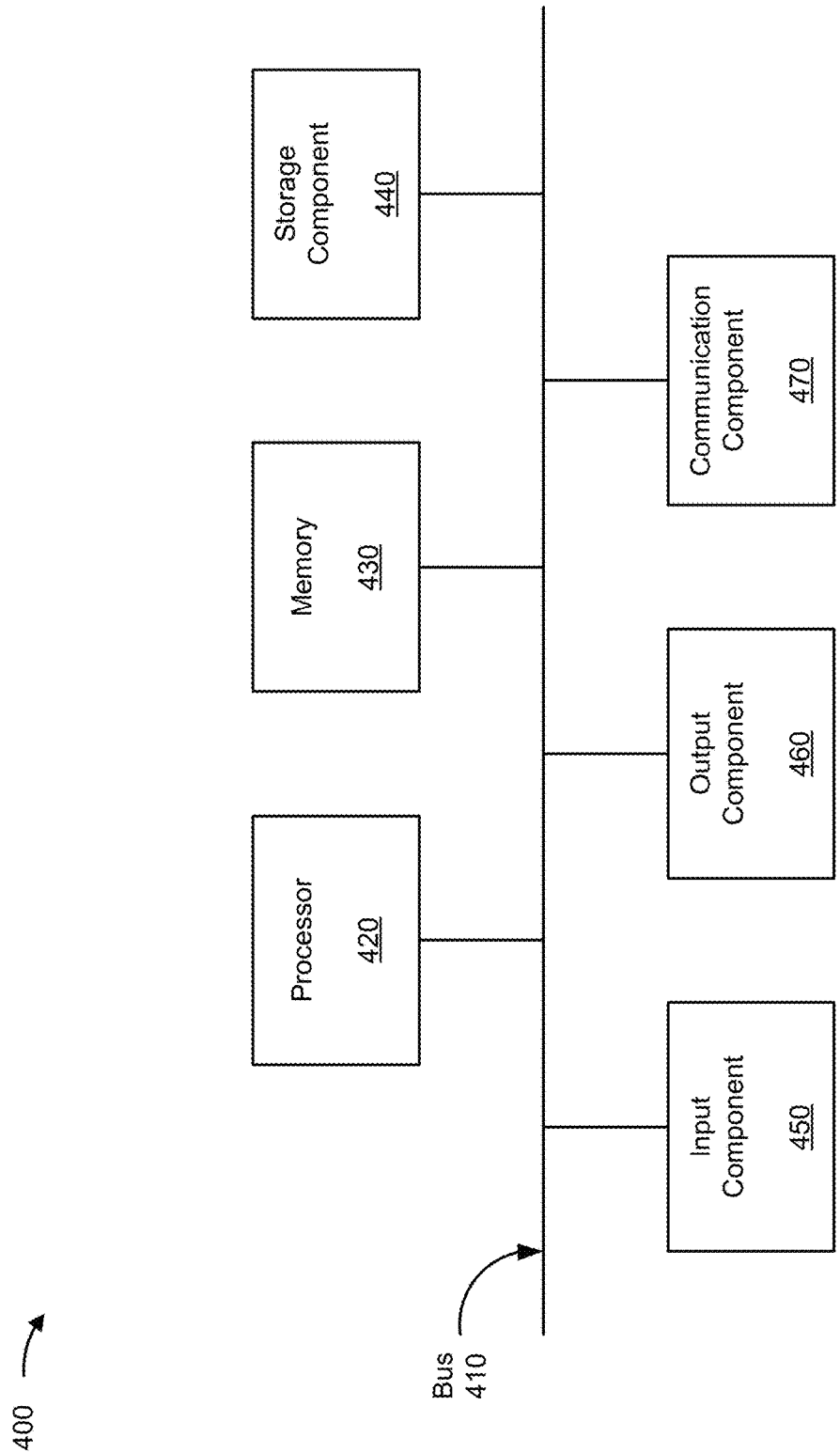
FIG. 4 is a diagram of example components of one or more devices of FIG. 2 and FIG. 3.

FIG. 4 is a diagram of example components of a device 400, which may correspond to the originating user device 105-1, the terminating user device 105-2, the originating content device 110, the originating messaging device 115, the first supplemental content device 120-1, the second supplemental content device 120-2, the third supplemental content device 120-3, the terminating content device 125, and the terminating messaging device 130.

In some implementations, the originating user device 105-1, the terminating user device 105-2, the originating content device 110, the originating messaging device 115, the first supplemental content device 120-1, the second supplemental content device 120-2, the third supplemental content device 120-3, the terminating content device 125, and the terminating messaging device 130 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
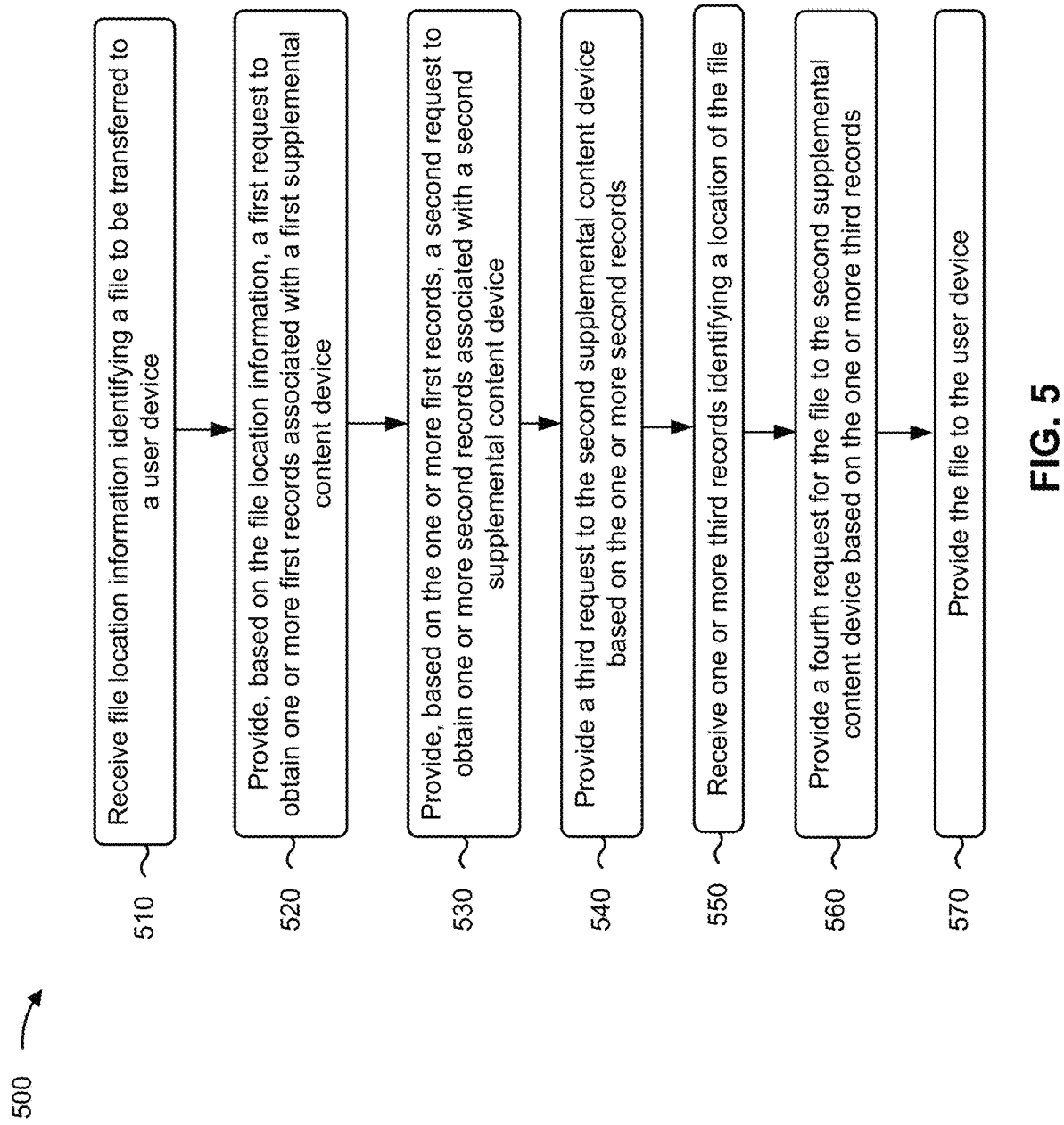
FIG. 5 is a flowchart of an example process relating to obtaining a file via a file transfer from one or more supplemental content devices.

FIG. 5 is a flowchart of an example process 500 relating to obtaining a file via a file transfer from one or more supplemental content devices. In some implementations, one or more process blocks of FIG. 5 may be performed by a user device (e.g., the originating user device 105-1 and/or the terminating user device 105-2), an originating content device (e.g., the originating content device 110), an originating messaging device (e.g., the originating messaging device 115), a third-party content device (e.g., the first supplemental content device 120-1, the second supplemental content device 120-2, and the third supplemental content device 120-3), a terminating content device (e.g., the terminating content device 125), and a terminating messaging device (e.g., the terminating messaging device 130). In some implementations, one or more process blocks of FIG. 5 may be performed by another device, or a group of devices separate from or including the terminating content device, such as the user device 105, the originating content device 110, the originating messaging device 115, a third-party content device (e.g., the supplemental content devices 120), the terminating content device 125, and the terminating messaging device 130.

Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, by a first content device of a first network provider, file location information identifying a file to be transferred to a user device associated with the first network provider (block 510). For example, the first content device may receive of a first network provider, file location information identifying a file to be transferred to a user device associated with the first network provider. The file location information identifies a domain name associated with a second network provider, as described above.

As further shown in FIG. 5, process 500 may include providing, based on the file location information, a first request to obtain one or more first records associated with a first content device (block 520). For example, the first content device may provide, based on the file location information, a first request to obtain one or more first records. The one or more first records identify the first supplemental content device 120-1 associated with the third network provider.

As further shown in FIG. 5, process 500 may further include providing, by the first content device and based on the one or more first records, a second request to obtain one or more second records associated with the second content device (block 530). For example, the first content device may provide, based on the one or more first records, a second request to obtain one or more second records. The one or more second records identify the second supplemental content device 120-2 associated with the fourth network provider.

As further shown in FIG. 5, process 500 may further include providing a third request to the second supplemental content device 120-2 based on the one or more third records (block 540). For example, the terminating content device 125 may provide a third request to the second supplemental content device 120-2 based on the one or more third records.

As further shown in FIG. 5, process 500 may further include receiving one or more third records identifying a location of the file (block 550). For example, the terminating content device 125 may receive one or more third records identifying a location of the file, e.g., based on NAPTR records that identify domain names associated with indirect transfers.

As further shown in FIG. 5, process 500 may further include providing a fourth request for the file to the second supplemental content device 120-2 based on the one or more third records (block 560). For example, based on the location of the file, terminating content device 125 may provide a fourth request to the second supplemental content device 120-2.

As further shown in FIG. 5, process 500 may further include providing the file to the user device (block 570). For example, terminating content device 125 may provide the retrieved file to the user device 105.

In additional or alternative implementations, receiving the one or more records may include receiving one or more NAPTR records. In additional or alternative implementations, the one or more first records may include one or more substitution expressions associated with the file location information. In additional or alternative implementations, process 500 may further include providing applying the one or more substitution expressions to the file location information and generating the second request based on applying the one or more substitution expressions to the file location information. In additional or alternative implementations, the one or more substitution expressions may include one or more regular expressions.

In additional or alternative implementations, the one or more second records may be used to identify the second supplemental content device, and to obtain the file from the second supplemental content device. In additional or alternative implementations, the first content device may provide, based on the one or more second records, a third request to the second supplemental content device. Further, in this example, the third request may be provided to the second supplemental content device based on the one or more second records identifying the second supplemental content device, and the file may be obtained by the first content device and based on the one or more third records, from the fourth content device.

In additional or alternative implementations, obtaining the file from the second supplemental content device based on the one or more second records may include providing a third request to obtain one or more third records associated with a fourth content device from the second supplemental content device, and obtaining, based on the one or more third records, the file from the fourth content device. In additional or alternative implementations, the second supplemental content device may be associated with the file location information based on a peering arrangement directed to the first supplemental content device. In additional or alternative implementations, receiving the file information includes receiving the file information via a Message Session Relay Protocol (MSRP) message.

In additional or alternative implementations, obtaining the file from the second supplemental content device includes obtaining the file by way of an indirect network-to-network interface (NNI) file transfer from the second supplemental content device.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a first content device of a first network provider, file location information identifying a file to be transferred to a user device associated with the first network provider,
    wherein the file location information identifies a domain name associated with a second network provider;
  providing, by the first content device and based on the file location information, a first request to obtain one or more first records,
    wherein the one or more first records identify a first supplemental content device;
  providing, by the first content device and based on the one or more first records, a second request to obtain one or more second records, wherein the second request is provided to the first supplemental content device based on the one or more first records, and wherein the one or more second records identify a second supplemental content device;

providing, by the first content device and based on the one or more second records, a third request to obtain one or more third records, wherein the one or more third records identify a location of the file;

receiving the one or more third records identifying the location of the file;

providing, by the first content device, a fourth request for the file to the second supplemental content device based on the one or more third records; and providing, by the first content device, the file to the user device.

2. The method of claim 1, further comprising:
obtaining the file from the second supplemental content device based on the fourth request for the file.

3. The method of claim 2, wherein the second supplemental content device is associated with the file location information based on a first peering arrangement directed to the first supplemental content device; and wherein obtaining the file from the second supplemental content device includes:
obtaining the file by way of an indirect network-to-network interface (NNI) file transfer from the second supplemental content device.

4. The method of claim 1, wherein receiving the one or more first records includes:
receiving one or more Name Authority Pointer (NAPTR) records associated with the domain name.

5. The method of claim 1, wherein the one or more first records includes one or more substitution expressions associated with the file location information.

6. The method of claim 5, wherein the one or more substitution expressions include one or more regular expressions.

7. The method of claim 5, further comprising:
applying, by the first content device, the one or more substitution expressions to the file location information; and generating, by the first content device, the second request based on applying, by the first content device, the one or more substitution expressions to the file location information.

8. A terminating content device, comprising:
one or more processors configured to:
receive file location information identifying a file to be transferred to a user device associated with a first network provider,
wherein the file location information identifies a first domain name associated with a second network provider, and
wherein the file location information is received from an originating content device associated with the second network provider;
provide a first request to the originating content device based on receiving the file location information;
receive one or more first records associated with a first supplemental content device based on providing the first request;
provide a second request to the first supplemental content device based on the one or more first records including information indicating that the file is to be obtained via the first supplemental content device;
receive one or more second records associated with a second supplemental content device;
obtain the file from the second supplemental content device based on the one or more second records; and
provide the file to the user device.

9. The terminating content device of claim 8, wherein the second supplemental content device is associated with the first supplemental content device based on a peering arrangement; and wherein the one or more processors, to obtain the file from the second supplemental content device, are configured to:
obtain the file by way of an indirect network-to-network interface (NNI) file transfer from the second supplemental content device.

10. The terminating content device of claim 8, wherein the one or more processors, to generate the second request, are configured to:
apply one or more regular expressions to the one or more first records to generate the second request.

11. The terminating content device of claim 10, wherein the one or more regular expressions are generated based on a second domain name associated with the second supplemental content device, and wherein the second supplemental content device comprises a third-party RCS hub.

12. The terminating content device of claim 8, wherein the file location information identifies the file by a first uniform resource locator (URL) associated with the file, wherein the one or more processors, to generate the second request, are configured to:
generate a second URL based on a regular expression applied to the first URL, and
wherein the regular expression is included in the one or more first records.

13. The terminating content device of claim 8, wherein the one or more processors, to obtain the file from the second supplemental content device, are configured to:
determine a network location of the second supplemental content device by analyzing the one or more second records.

14. The terminating content device of claim 8, wherein the one or more processors, to receive the file information, are configured to:
receive the file information via a Message Session Relay Protocol (MSRP) message.

15. A non-transitory computer readable medium storing a set of instructions, the set of instructions comprising:
one or more instructions that, when executed by one or more processors of a terminating content device, cause the terminating content device to:
receive file information identifying a file to be provided to a user device,
wherein the file information identifies a domain name associated with an originating content device;
provide, based on the file information, a first request for the file to the originating content device;
obtain, based on the first request, a first record associated with a first supplemental content device;
provide a second request for the file to the first supplemental content device,
wherein the second request is provided to the first supplemental content device based on the first record identifying the first supplemental content device;
obtain, based on the second request, a second record;

obtain, based on the second record, the file from a second supplemental content device; and provide the file to the user device.

16. The non-transitory computer readable medium of claim 15, wherein the first supplemental content device is associated with the originating content device based on a first peering arrangement, wherein the second supplemental content device is associated with the first supplemental content device based on a second peering arrangement, and wherein the one or more instructions that cause the terminating content device to obtain the file from the second supplemental content device, cause the terminating content device to:

obtain the file by way of an indirect network-to-network interface (NNI) file transfer from the second supplemental content device.

17. The non-transitory computer readable medium of claim 15, wherein the one or more instructions that cause the terminating content device to receive the file information, cause the terminating content device to:

receive the file information via a Message Session Relay Protocol (MSRP) message.

18. The non-transitory computer readable medium of claim 15, wherein the one or more processors, to obtain the file from the second supplemental content device, are configured to:

determine a network location of the second supplemental content device by analyzing the second record.

19. The non-transitory computer readable medium of claim 15, wherein the second record includes information indicating that the file is to be obtained from the second supplemental content device.

20. The non-transitory computer readable medium of claim 15, wherein the one or more instructions, that cause the terminating content device to receive the first record, cause the terminating content device to:

receive a pointer record associated with the domain name,
wherein the pointer record associates the originating content device with the second supplemental content device.

* * * * *